Feb. 23, 1960 L. G. PLANT 2,925,700
SIDE DELIVERY RAKE WITH HITCH MEANS
Filed Feb. 8, 1956 2 Sheets-Sheet 1
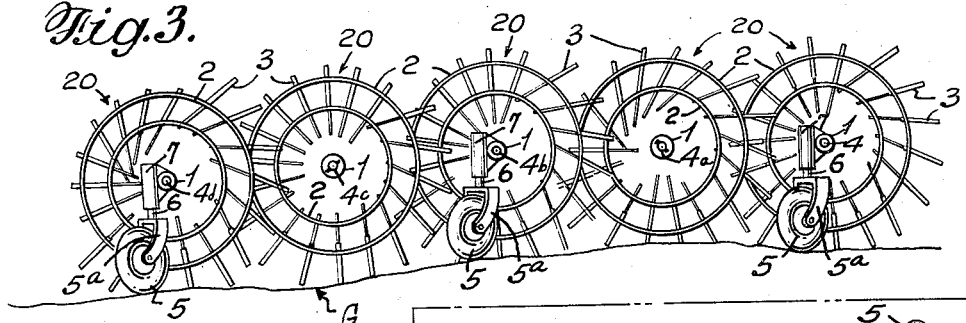
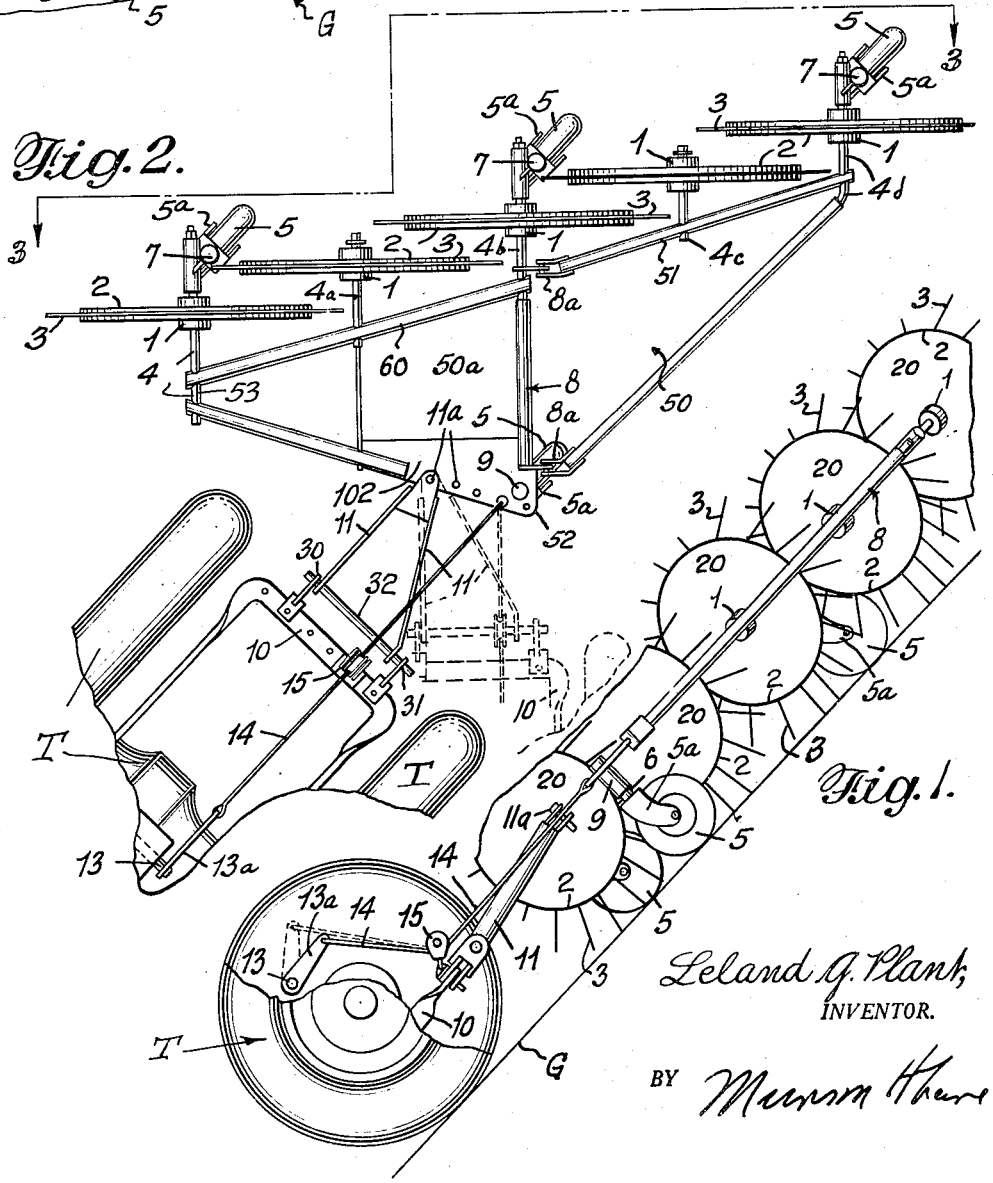
Leland G. Plant,
INVENTOR.

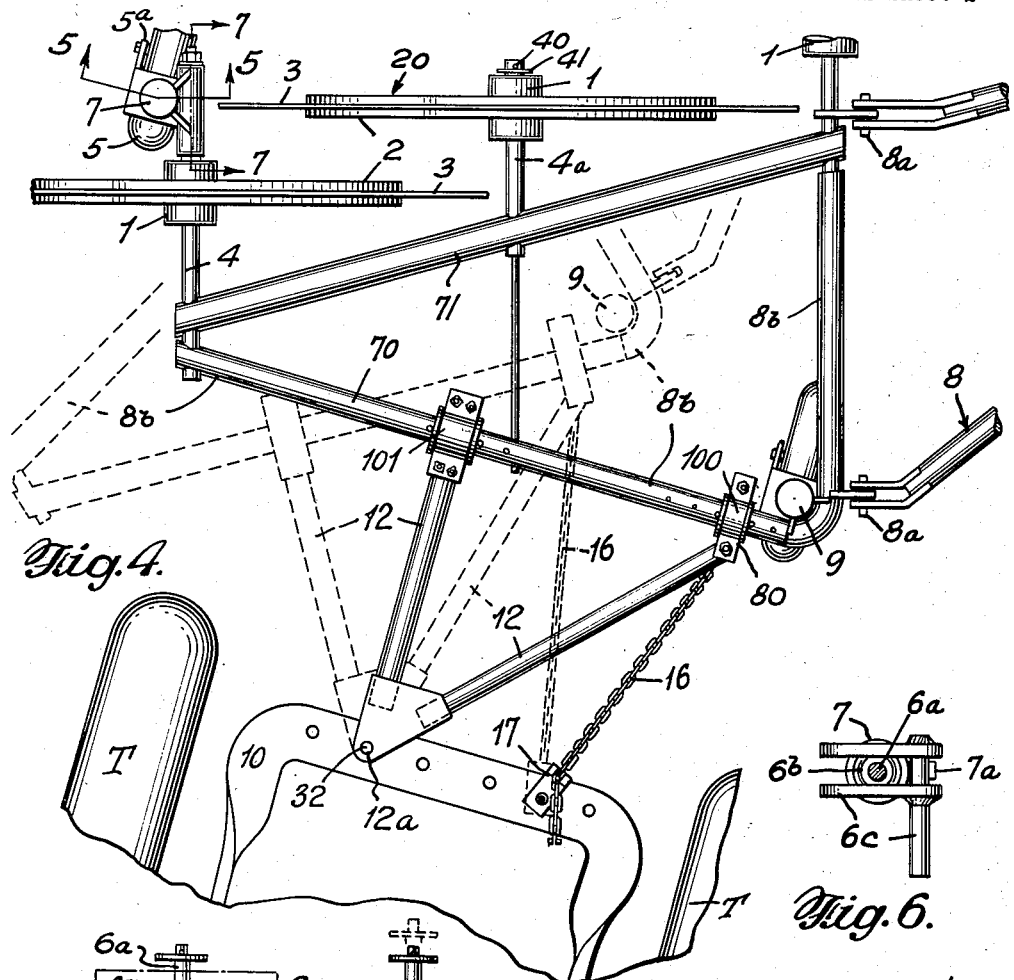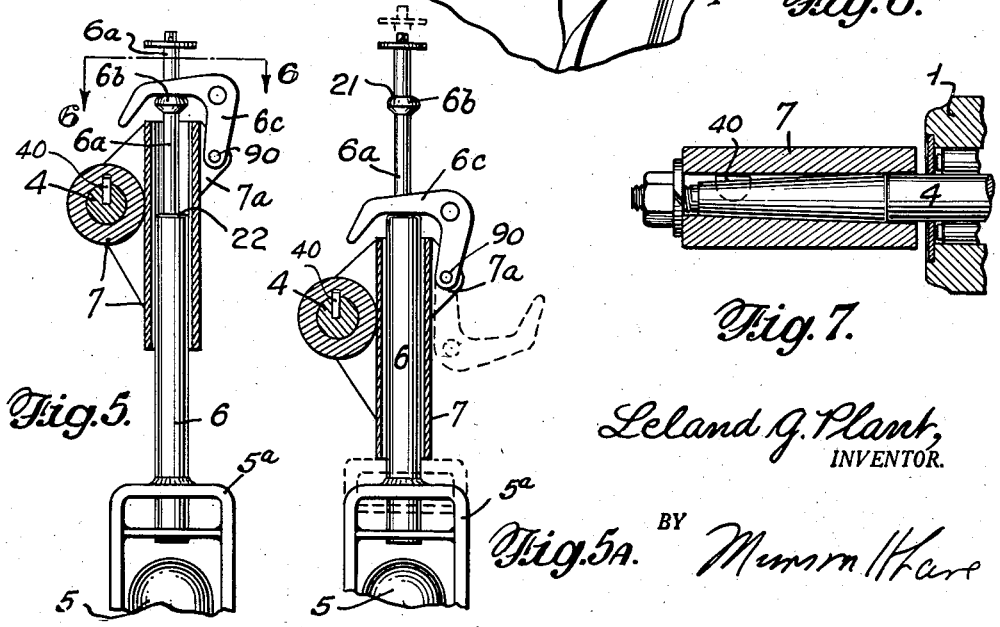

United States Patent Office 2,925,700
Patented Feb. 23, 1960

2,925,700

SIDE DELIVERY RAKE WITH HITCH MEANS

Leland G. Plant, Edenton, N.C.; Pattie Louise Moore Plant, executrix of said Leland G. Plant, deceased, assignor to Munson H. Lane, trustee, Washington, D.C.

Application February 8, 1956, Serial No. 564,238

9 Claims. (Cl. 56—27)

The invention relates to rakes and is in the nature of an improvement on the disclosures of my prior Patents Nos. 2,670,588, dated March 2, 1954, and 2,727,351, dated December 30, 1955. More particularly the present invention relates to a side delivery, tractor towed rake employing rotary, tine equipped members grouped in echelon and mounted upon sections of an articulated frame structure, each in fixed, non-floating position relative to the section on which mounted; the articulated sections of said frame each being supported upon ground wheels at a substantially constant adjusted height above the ground surface directly below it. In my invention this articulated frame is attached to a towing tractor through intermediate members designed to directionally control the frame members without lending any support to their weight which rests wholly upon said ground wheels which are all of a freely-swiveling caster mounted type.

In side delivery rakes having carriage mounted rotary raking members grouped in parallel planes, one overlapping the other, for being towed in a direction oblique to said planes, the thrust against its members tends to shift them sidewise relative to the direction of tow, and on hillsides this side slip may be augmented by gravity so that directional control is a requisite. In the vehicular type of rake having a carriage frame that is towed in distinction to raking attachments mounted upon and in part supported by the tractor, the present practice for controlling direction of this vehicle so that its rotary members will rake a swath of uniform width in the direction towed is to fix the axial angle of one or more ground wheels on which it is supported relative to the vehicle frame. In contrast to this prior art means of directional control for vehicular type rakes I introduce a unique drawbar between the tractor and structural frame of the rake, to one of which members it is horizontally pivoted upon a drawbar pin, its attachment to the other being non-swiveling, and I supplement this drawbar connection with a tension cord or equivalent linkage of manually adjusted or power controlled length between the tractor and rake vehicle, its connections thereto being spaced at a fixed distance from the drawbar pin.

The means I employ for directional control effectively restrains the raking vehicle from swerving out of its desired path because of the thrust above referred to, and further affords the novel advantage in raking mechanisms of manipulating the angularity of planes in which its rotary raking members revolve relative to path of travel, subject to control of the tractor operator while continuing in motion whether turning or moving in a straight path. Thus, as in one part of a field where the forage is light the raking members may be power shifted to a more oblique angle relative direction in which towed, thus raking a wider swath, or, as heavier forage is encountered, the raking members may be allowed to shift so that the planes in which they revolve are more nearly aligned with their towed direction, all as controlled at will by the tractor operator. Also, in making sharp turns the controlling means may be slacked, enabling the raking members to scribe a wider arc.

The invention will be more readily understood by reference to the accompanying drawings and the following detailed description, which are intended as illustrative of the inventive thought rather than as limiting the invention to the specific details of construction shown and described.

In the drawings:

Fig. 1 is a fragmentary side elevational view of the rake in accordance with the invention and also showing the rear portion of a tractor by which the rake is towed;

Fig. 2 is a plan view of an apparatus as illustrated in Fig. 1;

Fig. 3 is a rear elevation of the rake viewed in the plane 3—3 of Fig. 2;

Fig. 4 is an enlarged fragmentary plan view showing a modified form of the invention;

Fig. 5 is a sectional view in plane 5—5 of Fig. 4;

Fig. 5A is a view similar to Fig. 5 showing the same parts in another position;

Fig. 6 is a detail viewed in plane 6—6 of Fig. 5;

Fig. 7 is a sectional view taken in plane 7—7 of Fig. 4.

Referring to the drawings, reference numeral 1 denotes the hubs of raking wheels 20, and reference numeral 2 denotes the rims of such raking wheels. The raking wheel tines are indicated at 3 and are herein shown as a type slidably mounted in an inner and outer rim of the wheels, as more particularly described in my application Serial No. 382,391, now Patent No. 2,811,008, filed September 25, 1953. The axle shafts on which the hubs 1 are rotatably mounted are indicated at 4, 4a, 4b, 4c and 4d, and caster wheels 5 are shown as mounted in horns or brackets 5a. As shown stems 6 rise vertically from each of the caster wheel horns 5a having extensions 6a of lesser diameter than the stems 6, each extension being provided with a collar 6b thereon. The collar 6b and the junction between the stem 6 and its extension 6a are designed to provide shoulders 21 and 22 at selected elevations above each horn 5a, each shoulder being adapted for engagement with a claw shaped latch 6c in which the shoulders may turn, as in a thrust bearing (see Figs. 5 and 5A). Pedestals 7 are bored vertically for rotatable insertion of stems 6, and are bored horizontally for securing to axle shafts 4, 4b and 4d with suitable keys 40, said pedestals 7 each having a lug 7a to which one of the claw shaped latches 6c may be pinned in position to engage either of the above described shoulders 21 or 22, or to be disengaged therefrom.

The reference numeral 8 denotes an articulated frame structure having rigid sections on which the axle shafts 4, 4a, 4b, 4c and 4d are mounted in substantially horizontal positions, and the reference numeral 8a (Fig. 2) indicates hinged joints between the articulated sections which are herein indicated at 50 and 50a. The main section 50 of the frame may be of a triangular shape as shown, with the axle shafts 4b and 4d projecting horizontally from its corners and the axle shaft 4c parallel to the others, projecting from a leg 51 of the triangle. The frame section 50a is V-shaped and carries the shaft 4 fabricated integrally therewith in a horizontal position at its apex, this shaft being parallel to the shafts 4b, 4c and 4d on the frame section 50 when the sections are hinged together. The shaft 4a is fixed to the leg 60 of the frame section 50a midway between the shafts 4 and 4b and is also parallel to the other shafts. An alternative construction is shown at 8b in Fig. 4 corresponding to but specifically different from the forward section of frame 8 shown in Fig. 2. A pedestal 9 is shown as bracketed to the apex 52 of the articulated frame 8, and is provided with another caster wheel 5.

Adjacent the apex of the triangular frame 8, a drawbar member 11 of rigidly framed construction is universally jointed thereto, selectively at one of several points 11a. The other end of this drawbar is pinned pivotally in a vertical plane at two spaced points 30, 31 upon the tractor drawbar 10 of a tractor by which it is towed. The attachment of drawbar 11 to frame 8 at 11a and to two spaced points upon the tractor drawbar 10, are such therefore as to allow said frame and tractor drawbar to rise and fall freely one relative to the other. The drawbar member 11 connecting frame 8 and drawbar 10, is here shown as supplemented by a cable or equivalent linkage 14, attached to the frame 8 at a spaced distance from the pinned point 11a, and extending through a sheave block 15, fastened on drawbar 10, thence to the end of a crank arm 13a, to which it is tied at a desired length. This crank arm is mounted upon a lift shaft 13, rotated by hydraulic power (not shown) in the tractor chassis T, as is well known in the art. Rotation of shaft 13 and crank arm 13a, counterclockwise as viewed in Fig. 1, shortens the distance between the tractor drawbar where sheave 15 is attached and frame 8 at a spaced distance from point 11a, causing the tractor to assume a position relative to the raking frame indicated by broken outlines in Fig. 2; whereas, a clockwise turn of shaft 13 and crank arm 13a, allows the cable 14 to slack and distance to its attachment point on frame 8 to lengthen so that the tractor and rake structure may resume relative positions as shown in solid lines on Fig. 2.

In an alternate application of the invention as shown in Fig. 4, a rigid drawbar structure 12 is shown universally jointed at point 12a to the tractor drawbar 10 and pinned pivotally in a vertical plane at two spaced points 100 and 101 on leg 70 of a main frame section 8b of modified triangular form, adjacent to its apex opposite to the leg 71. As a further alternative for executing the purpose of this invention by simple means, instead of having a power actuated cable 14, as shown in Figs. 1 and 2, I may use a chain 16 fastened at one end to the frame section 8b by means of clamp 80 and attachable adjustably at its other end to the tractor drawbar 10, at a spaced distance from point 12a. To facilitate the adjustable attachment of this chain to the tractor drawbar I may provide a chain hook 17, bolted or pinned to the tractor drawbar. In this arrangement the length of chain from said drawbar to the frame section 8b can be manually adjusted by selectively hooking a link to this chain in 17. As illustrated by solid lines in Fig. 4, the chain 16 is attached to the tractor drawbar at a shortened length to hold the rotary raking members at a desired angle to the direction in which they are being towed as against a thrust upon these raking members when raking that tends to swing them away from this position. If the chain connection 16 is lengthened, as indicated in broken outline in Fig. 4 the frame section 8b and rotary raking members thereon and the planes in which they revolve will assume a position more nearly in line with the direction in which towed by the tractor T. For road travel chain 16 can be slacked or removed and point 12a shifted toward or beyond the mid-point of the tractor drawbar 10, so that the raking apparatus will assume a position requiring less side clearance as it trails in the wake of the tractor.

For road travel the rotary raking members 20 with their tines 3, must be carried clear of the ground and in my invention this is accomplished by raising the height of pedestals 7 as shown in Figure 5 whereby the axle shafts 4, to which the pedestals 7 are clamped, will be elevated sufficiently above the ground to raise the raking members so that their tines clear the ground surface G directly below it. For a normal raking operation the desired height of raking members and their tines relative to the ground surface is determined and the shoulder 22 formed upon each stem 6 at such a distance from the ground wheel axle that when this shoulder is engaged by the claw shaped latch 6c, the axle shaft clasped by that pedestal will be supported at a height that will position the raking member and its tines in the desired relation to the ground surface G. For situations in which it may be desirable to lower the raking members so that their tines will scribe the ground surface more deeply the latch 6c may be entirely disengaged from the stem 6 as indicated by broken lines in Fig. 5A and the pedestal 7 dropped until its lower edge rests upon the top of horn 5a, in the manner of a thrust bearing.

The means here employed in a rotary type side delivery rake for positioning its raking members at their most efficient height for raking, and for restraining said raking members from riding over heavy forage or allowing their tines to dig into the ground surface with consequent damage thereto and contamination of the hay with dirt and other matter scraped from the ground, is disclosed in my Patent No. 2,727,351 as an improvement upon rakes of the rotary type that rely on a spring counterbalance applied to each raking member floating on a vehicle frame in supported relation thereto for positioning them approximately as described. The articulated frame features devised by me in its present application to side delivery rakes of the rotary type is here employed as the means for mounting a portion of the raking members on axles rigidly fixed upon frame members but positioned in a manner to approximate their desired elevation without requiring separate pedestals and individual ground wheels for each member.

My present arrangement is one in which the rotary raking members 20 with fixed length straight tines flexibly mounted on a wheel rim, as now commonly applied to rotary type rakes, can here be utilized but, in distinction to the rakes having spring counterbalanced rotary members floating on a vehicle frame in supported relation thereto, wherein a substantial portion of the weight of said members must rest upon its tines, my invention is adapted to use of tines of a type having such elasticity that they flex in and out radially in response to extensions thereof resting upon the ground surface. The invention is, moreover, adapted to the use of tines slidably mounted in double rims so that they can move in and outwardly from the hub in radial alignment therewith and droop at an angle to said alignment while revolving upon the rim in a rising direction, substantially as disclosed in my Patent No. 2,811,008, and here generally illustrated in Fig. 3.

The novel directional control means here introduced not only provides a feature new to side delivery rakes in respect to enabling an operator to alter the angularity of its rotary raking members in relation to direction towed, by power means, at will while the rake and tractor by which towed are in motion, but provides a more positive directional control means than where the ground wheels supporting a mobile frame and its raking members are mainly relied on for this purpose. It is common practice in such rakes to position their draft tongue at a considerable angle to the plane or planes in which their guiding ground wheels are fixed relative to the supported vehicle so that as this mobile frame is being towed it is in a path substantially offset from the tractor path, in order to counteract the side thrust upon its raking members, a measure not requisite to the proper functioning of this invention. Also, as devised, my directional control means can be relaxed by its operator, at will, when the tractor makes a sharp turn allowing the raking apparatus to turn in a wider arc.

The invention has been described in detail for the purpose of illustration but it will be obvious that numerous modifications and variations may be resorted to within the scope of the appended claims without departing from the spirit of the invention.

I claim:

1. The combination of a tractor, a side delivery rake including a frame and a set of raking members mounted on said frame for rotation in spaced overlapped vertical planes, a rigid draft member pivotally connecting said frame to said tractor for relative movement in a horizontal plane, an elongated flexible draft element connected to the frame and to the tractor at points spaced horizontally from said draft member whereby to permit relative lateral movement of the frame and tractor in one horizontal direction during slackening of said flexible draft element but prevent relative lateral movement thereof in the opposite horizontal direction beyond a point where the draft element is taut, and means cooperating with said draft element to vary the effective length thereof and correspondingly adjust the relative position of said frame and tractor at which the draft element becomes effective to prevent their relative movement in said opposite direction.

2. The combination as defined in claim 1 together with pivot means cooperating with said draft member to permit raising and lowering of said frame relative to said tractor.

3. The combination as defined in claim 1 wherein said rake also includes a set of travelling wheels supporting said frame, and vertically adjustable means mounting said frame on said wheels whereby the frame may be raised and lowered relative to the ground, together with pivot means cooperating with said draft member to permit raising and lowering of the frame relative to the tractor.

4. The combination of a tractor, a side delivery rake including a frame, and a set of raking members mounted on said frame for rotation on spaced overlapped vertical planes, an elongated rigid draft member extending between said frame and said tractor, pivot means provided at one end of said draft member to permit raising and lowering of the frame relative to the tractor, pivot means provided at the other end of the draft member to permit lateral movement of the frame relative to the tractor in a horizontal plane, and an elongated flexible draft element connected to the frame and to the tractor at points spaced horizontally from said draft member whereby to permit lateral movement of the frame relative to the tractor in one horizontal direction during slackening of said flexible draft element but prevent lateral movement thereof in the opposite horizontal direction beyond a point where the draft element is taut, said draft element being adjustable as to its effective length to adjust the position of the frame relative to the tractor at which the draft element becomes effective to prevent lateral movement of the frame in said opposite direction.

5. The combination as defined in claim 4 wherein said tractor includes a power-actuated crank arm, one end of said flexible draft element being connected to said crank arm whereby the effective length of the draft element may be adjusted by actuation of said arm.

6. The combination as defined in claim 4 wherein said frame of said rake is articulated and comprises a plurality of frame sections pivotally connected together for mutually independent raising and lowering movement.

7. The combination of a tractor, a side delivery rake including a frame, a set of raking members mounted on said frame for rotation in spaced overlapped vertical planes, a set of travelling caster wheels supporting said frame, and vertically adjustable means mounting said frame on said wheels whereby the frame may be raised and lowered relative to the ground, an elongated rigid draft member extending between said frame and said tractor, horizontal pivot means provided at one end of said draft member to permit raising and lowering of the frame relative to the tractor, vertical pivot means provided at the other end of the draft member to permit lateral movement of the frame relative to the tractor in a horizontal plane, an elongated flexible draft element connected to the frame and to the tractor at points spaced horizontally from said draft member whereby to permit movement of the frame relative to the tractor in one horizontal direction during slackening of said flexible draft element but prevent movement thereof in the opposite horizontal direction beyond a point where the draft element is taut, and means provided at one end of said flexible draft element for varying its effective length whereby to adjust the position of the frame relative to the tractor at which the draft element becomes effective to prevent movement of the frame in said opposite direction.

8. The combination as defined in claim 7 wherein said frame of said rake is articulated and comprises a plurality of frame sections each carrying at least one of said raking members and being supported by at least one of said wheels, and horizontal pivot means connecting said frame sections together for mutually independent raising and lowering movement.

9. The combination as defined in claim 7 wherein said means for varying the effective length of said flexible draft element comprise a power-actuated crank arm provided on said tractor and having one end of said draft element operatively connected thereto.

References Cited in the file of this patent

UNITED STATES PATENTS

| | | |
|---|---|---|
| 1,340,504 | Seitz | May 18, 1920 |
| 2,540,228 | Adkisson | Feb. 6, 1951 |
| 2,599,617 | Davis | June 10, 1952 |
| 2,635,411 | Hicks | Apr. 21, 1953 |
| 2,680,343 | Enos | June 8, 1954 |
| 2,689,446 | Sorrels | Sept. 21, 1954 |

FOREIGN PATENTS

| | | |
|---|---|---|
| 1,095,043 | France | Dec. 15, 1954 |
| 1,104,540 | France | June 15, 1955 |